United States Patent
Engel

(10) Patent No.: US 9,664,887 B2
(45) Date of Patent: May 30, 2017

(54) REPLACEABLE ILLUMINATION MODULE FOR A COORDINATE MEASURING MACHINE

(71) Applicant: Carl Zeiss Industrielle Messtechnik GmbH, Oberkochen (DE)

(72) Inventor: Thomas Engel, Aalen (DE)

(73) Assignee: CARL ZEISS INDUSTRIELLE MESSTECHNIK GMBH, Oberkochen (DE)

(*) Notice: Subject to any disclaimer, the term of this patent is extended or adjusted under 35 U.S.C. 154(b) by 33 days.

(21) Appl. No.: 14/529,964

(22) Filed: Oct. 31, 2014

(65) Prior Publication Data

US 2015/0055143 A1 Feb. 26, 2015

Related U.S. Application Data

(63) Continuation of application No. PCT/EP2012/058393, filed on May 7, 2012.

(51) Int. Cl.
*G01B 11/14* (2006.01)
*G02B 21/08* (2006.01)
(Continued)

(52) U.S. Cl.
CPC .......... *G02B 21/082* (2013.01); *G01B 11/005* (2013.01); *G01B 11/007* (2013.01); *G01B 21/047* (2013.01); *G02B 6/0001* (2013.01)

(58) Field of Classification Search
CPC .... G01B 5/0002; G01B 5/008; G01B 11/005; G01B 11/007; B23Q 17/002; G02B 21/082; G02B 21/047; G02B 6/0001
(Continued)

(56) References Cited

U.S. PATENT DOCUMENTS 4,677,473 A 6/1987 Okamoto et al.
4,963,728 A 10/1990 Hof et al.
(Continued)

FOREIGN PATENT DOCUMENTS

CN 1500199 A 5/2004
DE 10 2004 022 314 A1 12/2005
(Continued)

OTHER PUBLICATIONS

English translation of International Preliminary Report on Patentability (Chapter 1); issued by WIPO Nov. 11, 2014; 9 pp.
(Continued)

*Primary Examiner* — Hina F Ayub
(74) *Attorney, Agent, or Firm* — Harness, Dickey & Pierce, P.L.C.

(57) ABSTRACT

An illumination module for a coordinate measuring machine for measuring a workpiece by means of an optical sensor, wherein the illumination module comprises a main body having a sensor side and a workpiece side, wherein the sensor side has a first interface device at least for the sensor-side coupling of the illumination module in a defined position, and wherein the illumination module comprises at least one illumination arrangement for illuminating the workpiece. Furthermore, the main body has the form of a ring having a free central region and an edge region, wherein the at least one illumination arrangement and the first interface device are arranged in the edge region.

21 Claims, 6 Drawing Sheets

(51) Int. Cl.
  *G01B 21/04* (2006.01)
  *G01B 11/00* (2006.01)
  *F21V 8/00* (2006.01)
(58) Field of Classification Search
  USPC .................................. 356/614, 237.1, 241.1
  See application file for complete search history.

(56) References Cited

U.S. PATENT DOCUMENTS

| | | | | |
|---|---|---|---|---|
| 5,038,258 | A * | 8/1991 | Koch | G01B 11/00 359/656 |
| 5,210,399 | A * | 5/1993 | Maag | G01B 11/007 250/202 |
| 5,251,156 | A * | 10/1993 | Heier | G01B 11/005 33/503 |
| 5,825,666 | A | 10/1998 | Freifeld | |
| 6,469,619 | B1 * | 10/2002 | Mayercheck | E21F 17/18 340/321 |
| 6,772,527 | B1 | 8/2004 | Butter et al. | |
| 6,948,825 | B2 | 9/2005 | Christoph | |
| 7,649,685 | B2 * | 1/2010 | Spink | G02B 21/0012 359/372 |
| 2008/0134486 | A1 | 6/2008 | Enderle et al. | |
| 2008/0239612 | A1 * | 10/2008 | Zhang | B66C 1/08 361/144 |
| 2011/0154672 | A1 * | 6/2011 | Jensen | G01B 11/007 33/503 |
| 2012/0262728 | A1 * | 10/2012 | Bridges | G01C 15/002 356/614 |
| 2015/0253124 | A1 * | 9/2015 | Steffey | G01B 21/045 356/614 |

FOREIGN PATENT DOCUMENTS

| | | |
|---|---|---|
| DE | 10 2006 035 179 | 9/2007 |
| EP | 0 362 625 A2 | 4/1990 |
| EP | 0 385 262 A2 | 9/1990 |
| EP | 1 072 884 A2 | 1/2001 |
| EP | 1 580 521 A2 | 8/2005 |
| EP | 1 373 827 B1 | 10/2009 |

OTHER PUBLICATIONS

International Search Report with Written Opinion; ISA/EP; mailed Oct. 5, 2012; 12 pp.
English language translation of Chinese Office Action for Appl'n No. 2012800744275; issued Aug. 29, 2016; 22 pp.

* cited by examiner

REPLACEABLE ILLUMINATION MODULE FOR A COORDINATE MEASURING MACHINE

CROSS-REFERENCE TO RELATED APPLICATIONS

This is a Continuation application of International patent application PCT/EP2012/058393, filed May 7, 2012.

BACKGROUND OF THE INVENTION

In accordance with a first aspect, the present invention relates to an illumination module for a coordinate measuring machine for measuring a workpiece by means of an optical sensor, wherein the illumination module comprises a main body having a sensor side and a workpiece side, wherein the sensor side has a first interface device at least for the sensor-side coupling of the illumination module in a defined position, and wherein the illumination module comprises at least one illumination arrangement for illuminating the workpiece.

In accordance with a second aspect, the present invention relates to a coordinate measuring machine comprising such an illumination module.

In accordance with a third aspect, the present invention furthermore relates to a method for taking up an illumination module of a coordinate measuring machine for measuring a workpiece by means of an optical sensor, wherein the coordinate measuring machine comprises at least one first illumination module which can be coupled to the optical sensor at least indirectly, and a holding device having at least one first magazine site for the first illumination module.

In accordance with a fourth aspect, the present invention relates to a computer program product.

Coordinate measuring machines are generally known in the prior art. They serve to check workpieces in the context of quality assurance, for example, or to determine the geometry of a workpiece completely in the context of so-called "reverse engineering". Furthermore, diverse further application possibilities are conceivable.

In such coordinate measuring machines, various types of sensors can be employed in order to set the coordinates of a workpiece to be measured. By way of example, sensors that effect tactile measurement are known for this purpose, such as are sold for example by the applicant under the product designation "VAST", "VAST XT" or "VAST XXT". In this case, the surface of the workpiece to be measured is probed with a probe pin whose coordinates in the measurement space are continuously known. Such a probe pin can also be moved along the surface of a workpiece, such that in such a measuring process in the context of a so-called "scanning method" a multiplicity of measurement points can be detected at defined time intervals.

Furthermore, it is known to use optical sensors which enable the coordinates of a workpiece to be detected contactlessly. One example of such an optical sensor is the optical sensor sold by the applicant under the product designation "ViScan".

The sensors can then be used in various types of measurement set-ups. One example of such a measurement set-up is the product "O-INSPECT" from the applicant. In such a machine, both an optical sensor and a tactile sensor are used to carry out different inspection tasks on one machine and ideally with a single clamping of a workpiece to be measured.

Sensor systems having optical sensors are becoming increasingly important in coordinate measuring technology. In this case, optical sensors are distinguished in particular by a high speed of the measuring process. In this way, many inspection tasks for example in medical technology, plastics technology, electronics and precision mechanics can be carried out. It goes without saying that, furthermore, various other set-ups are also conceivable.

Traditionally, the optical sensor head or the optical sensor is connected to a carrier system that supports and moves the optical sensor system. Various carrier systems are known in the prior art, for example gantry systems, stand, horizontal arm and arm systems, and all kinds of robot systems. In this case, the carrier systems can furthermore have system components that enable the sensor head to be positioned as flexibly as possible. One example thereof is the rotary-pivoting articulated joint from the applicant sold under the designation "RDS". Furthermore, various adapters can be provided in order to connect the different system components of the carrier system among one another and to the sensor system.

Furthermore, in coordinate measuring technology it is customary that different types of illumination can be applied when measuring objects. The corresponding optical sensors then have a video camera and/or a photographic camera and a corresponding illumination for the workpiece. Furthermore, a fixed imaging optics is provided, which images the workpiece to be measured onto the camera or the optical sensors of the camera. In this case, specific optical sensors with fixedly integrated illuminations and imaging optics are generally provided for each application or each type of measurement.

By way of example, the document EP 0 362 625 A2 cited in the introduction discloses an exchangeable front optics for an optical probe head. Said front optics is designed for a specific working distance and a specific type of illumination. Furthermore, it comprises the entire lens that images light rays reflected from the workpiece onto the optical sensor.

However, on account of the optical elements for imaging, such a front optics is relatively heavy and has a relatively large volume. Furthermore, such a front optics can be used only for one specific application, i.e. at one specific working distance and for one specific type of illumination.

Furthermore, the documents EP 0 385 262 A2 and EP 1 373 827 B1 likewise specify illumination devices for coordinate measuring machines which firstly comprise imaging optics and secondly comprise illumination elements of relatively complex design, for example pivotable or movable illumination elements, in order to set the illumination to different wavelength distances. However, this also results in a relatively complex construction of such illumination elements and a possibly higher weight and volume, which, on account of the higher inertia associated therewith, makes it more difficult to regulate the optical sensor head, particularly during rapid measuring processes.

BRIEF SUMMARY OF THE INVENTION

Therefore, it is an object of the present invention to specify an illumination module for a coordinate measuring machine with an optical sensor which is constructed in a simple manner and enables the greatest possible flexibility in the use of the optical sensor of the coordinate measuring machine.

in accordance with a first aspect, it is provided an illumination module for a coordinate measuring machine for measuring a workpiece by means of an optical sensor, wherein the illumination module comprises a main body having a sensor side and a workpiece side, wherein the sensor side has a first interface device at least for the sensor-side coupling of the illumination module in a defined position, and wherein the illumination module comprises at least one illumination arrangement for illuminating the workpiece, wherein the main body has the form of a ring having a free central region and an edge region, wherein the at least one illumination arrangement and the first interface device are arranged in the edge region.

In this case, a "ring" should be understood to mean an arbitrary closed cross section. Consequently, the term "ring" does not necessarily mean that the cross section is rotated about an axis, thereby resulting in a circular ring. A "ring" is understood to mean the extrusion of a cross section along an arbitrary closed line. By way of example, the "ring" can thus also have a quadrilateral outer shape such as arises, for example, if an arbitrary cross section, for example a circle or a rectangle, is extruded along a closed square line.

In this case, a central region remains free, the free central region. The region in which the main body extends in a ring-shaped fashion is then the edge region. Consequently, "free," as used herein and in the Claims, should be understood to mean that the illumination module ultimately has a central cutout. The light which is ultimately intended to be imaged onto the optical sensor can pass through this central cutout without beam deflection.

The at least one illumination arrangement and the first interference device for the sensor-side coupling of the illumination module are then arranged in the edge region.

In this case, "sensor-side" is understood to mean that side of the illumination module which faces the direction of the optical sensor. It is situated opposite a "workpiece-side" of the illumination module facing in the direction of the workpiece. The light for illuminating the workpiece is further emitted from the workpiece-side of the illumination module.

In this way, an illumination module is provided which is configured in the form of a ring bearing the illumination. The free central region allows light radiation reflected from the workpiece to pass through to the optical sensor. Any imaging optics can therefore be dispensed with. This construction allows the illumination module to be configured easily and in a manner reduced to the essentials, which ultimately enables the illumination module to be replaced rapidly in an application-specific manner. In this case, the illumination module can be changed either manually or automatically. In this way it becomes possible to provide different standard illumination types, but also customized solutions for specific illuminations in connection with an optical sensor configured in a conventional manner.

In accordance with a second aspect, it is proposed to provide a coordinate measuring machine for measuring a workpiece by means of an optical sensor, wherein the coordinate measuring machine comprises at least one illumination module, in particular a plurality of illumination modules, in accordance with the first aspect of the invention or one of its refinements and furthermore comprises a holding device having at least one magazine site, in particular a plurality of magazine sites, for the illumination module or the illumination modules. Hence, for example it can be provided a coordinate measuring machine for measuring a workpiece by means of an optical sensor, wherein the coordinate measuring machine comprises at least one illumination module for a coordinate measuring machine for measuring a workpiece by means of an optical sensor, wherein the illumination module comprises a main body having a sensor side and a workpiece side, wherein the sensor side has a first interface device at least for the sensor-side coupling of the illumination module in a defined position, and wherein the illumination module comprises at least one illumination arrangement for illuminating the workpiece, wherein the main body has the form of a ring having a free central region and an edge region, wherein the at least one illumination arrangement and the first interface device are arranged in the edge region, and wherein the coordinate measuring machine further comprises a holding device having at least one magazine site for the illumination module In this way it becomes possible for example to change the illumination module automatically. The holding device can have, for instance, a plurality of magazine sites, in each of which an illumination module is placed. By means of the machine frame provided anyway for the movement of the optical sensor head, in this way in a targeted manner a magazine site can be approached by means of the optical sensor and can be coupled to an illumination module. In this way, also in a targeted manner illumination modules can be placed in a magazine site again and a coupling of an illumination module to the optical sensor can be separated again. Afterward, by way of example, another illumination module can then be taken up. In particular, a change interface corresponding to those of the probe plates of tactile sensors can be provided for the illumination modules. This makes it possible to use the magazine sites both for probe plates and for illumination modules. A regulating device of the coordinate measuring machine can then store information regarding which type of illumination module or probe plate is placed in which of the magazine sites. In this regard, the number of required magazine sites can be minimized and the flexibility in the application can be optimized.

In accordance with a third aspect of the invention, it is proposed to provide a method for taking up an illumination module of a coordinate measuring machine for measuring a workpiece by means of an optical sensor, wherein the coordinate measuring machine comprises at least one first illumination module which can be coupled to the optical sensor at least indirectly, and a holding device having at least one first magazine site for the first illumination module, comprising the following steps:

moving an optical sensor of the coordinate measuring machine and first magazine site having the first illumination module relative to one another into a first position, in which the optical sensor and the first illumination module can be coupled at least indirectly by means of a translational and/or rotational movement relative to one another, performing a translational and/or rotational relative movement between the optical sensor and the first illumination module for the purpose of at least indirectly coupling the optical sensor to the first illumination module, and moving the first illumination module coupled at least indirectly to the optical sensor out of the first magazine site.

In this way it becomes possible, by means of a simple movement sequence with the aid of actuators present anyway in the coordinate measuring machine, to couple an illumination module to the optical sensor and to remove it from its corresponding magazine site. In particular, the relative movement between the optical sensor and the first illumination module can be a purely translational movement.

In accordance with a fourth aspect of the invention, provision is furthermore made of a computer program product comprising program code means designed to perform a method in accordance with the third aspect of the invention or one of its refinements, if they are executed on a regulating device of a coordinate measuring machine. Hence, for example it can be provided a computer program product comprising program code means designed to perform a method for taking up an illumination module of a coordinate measuring machine for measuring a workpiece by means of an optical sensor, wherein the coordinate measuring machine comprises at least one first illumination module which can be coupled to the optical sensor at least indirectly, and a holding device having at least one first magazine site for the first illumination module, comprising the steps of moving an optical sensor of the coordinate measuring machine and a first magazine site having the first illumination module relative to one another into a first position, in which the optical sensor and the first illumination module can be coupled at least indirectly by means of a translational and/or rotational movement relative to one another, performing a translational and/or rotational relative movement between the optical sensor and the first illumination module for the purpose of at least indirectly coupling the optical sensor to the first illumination module, and moving the first illumination module coupled at least indirectly to the optical sensor out of the first magazine site, if they are executed on a regulating device of a coordinate measuring machine In one refinement of the invention, it can be provided in this case that the at least one illumination arrangement has at least one light guide and/or at least one refractive optical element and/or at least one diffractive optical element and/or at least one holographic optical element and/or at least one reflective optical element.

All these types of optical elements can also be summarized hereinafter as "passive illumination arrangement". Such a passive illumination arrangement is thus distinguished by the fact that it itself has no light-emitting light source. In this case, a light source is then arranged for example in the optical sensor itself. Via the first interface device, light from said light source can then be coupled for example into a light guide of the illumination arrangement. There, the light is deflected by means of the refractive, diffractive or holographic optical elements and/or reflected by means of at least one reflective optical element, such that a desired illumination type is established.

In a further refinement of the invention, it is provided that the at least one illumination arrangement has a ring-shaped light guide.

Such a ring-shaped light guide can be provided, for example, by splicing the ends of a fiber-optic cable in order thus to distribute them uniformly over a ring-shaped cross section and to provide a ring-shaped illumination of a workpiece.

Furthermore, in one refinement of the illumination module in accordance with the first aspect, it can be provided that the illumination module comprises a plurality of illumination arrangements each having at least one light guide.

Accordingly, it is thus also possible for a plurality of parallel illumination channels to be used in order to illuminate the workpiece as desired.

In a further refinement, it can be provided that the at least one illumination arrangement has a light source.

It can therefore also be provided that the at least one illumination arrangement itself is formed by a light-emitting light source on the illumination module. In this case, it can be provided, in particular, that the at least one light source is an LED (light-emitting diode) or an OLED (organic light-emitting diode). The use of lasers with beam shaping optics or the use of a polarizer in the at least one illumination arrangement is also conceivable.

Such an illumination arrangement which itself emits light or has a light source can also be designated hereinafter as "active illumination arrangement".

It goes without saying that it is also possible for an illumination module to comprise both passive and active illumination arrangements in combination.

In one refinement of the invention, it can furthermore be provided that the first interface device of the illumination module has an energy receiving device for receiving energy, in particular electrical energy.

The energy receiving device can be a socket, for example, into which a plug is plugged during coupling to the optical sensor. However, the energy receiving device can also be embodied in a contactless fashion, for example. By way of example, via the first interface device, energy can be transmitted by means of magnetic induction. In this way, it is possible to supply the coupled illumination module with energy, for example in order to provide the energy necessary for operating a light source.

In this way, it is possible to provide different illumination types by means of a correspondingly configured illumination module.

By way of example, in this way, a diffuse axial light can be provided, in which the light comes from the camera axis, such that no shadow formation and no reflection of the camera in the object take place. This can be used for example for reflective surfaces or cavities.

Furthermore, it is possible to provide a dark field illumination which provides a perimetric bright light, in particular in order to highlight edges of objects with high transmittance. Such a light is appropriate, for example, for identifying surface defects and for edge detection.

Furthermore, by way of example, a diffuse and uniformly distributed light can be radiated laterally onto the workpiece, a so-called "soft reflected light". Depending on the angle of incidence relative to the camera axis, such a soft reflected light can be used, for example, to identify surface defects such as scratches, lines or unevennesses.

With a direct reflected light, a so-called bright field, the light can be projected onto the workpiece at a specific angle. In this way, it is possible to bring about strong contrasts and shadows which can improve the identification of textures and surface structures.

Furthermore, in this way, a direct ring light can be provided, for example, which generates symmetrical cast shadows. The quantity of light radiated onto the workpiece and reflected from the latter is high in this case, and so it is suitable in particular for relatively large working distances.

The ring light can also be embodied diffusely. The influence of surface inaccuracies is reduced in this case, and this ring light is suitable in particular for use on lustrous surfaces.

By way of example, in this way it is also possible to provide a diffuse dome illumination in order to project light onto the workpiece from all directions and largely to avoid shadow formations. In particular, this illumination is suitable in connection with specularly reflective surfaces, for example.

All these illumination types differ from one another considerably in some instances, in particular for example in the angles at which the light is radiated onto the workpiece relative to an optical axis of an imaging optics of the optical sensor. By means of a respective illumination module, it is thus possible to provide any illumination type for any working distance, etc., that is to say a tailored solution for every application, which can rapidly be replaced by a different one during operation.

In a further refinement of the invention, it can be provided that the main body has the form of a circular ring.

As has already been explained above, the circular form of the ring of the main body can afford advantages with regard to the configuration of the illumination arrangement. By way of example, it can correlate with a circular configuration of a light guide an illumination arrangement of the illumination module. In particular, a circular configuration of the ring of the main body generally enables a facilitated arrangement of the illumination arrangements in order to provide a rotationally symmetrical illumination with respect to an optical axis of an imaging optics of the optical sensor.

In one refinement of the invention, it can furthermore be provided that the illumination module comprises a second interface device for the workpiece-side coupling of the illumination module to a further illumination module or a tactile sensor.

In this way it becomes possible, for example, to use a plurality of illumination modules in a cascaded fashion. By way of example, it is conceivable to place an illumination module which substantially consists of a diffusing plate onto an illumination module which provides a directional illumination. It thus becomes possible to achieve specific application-related illumination types by the coupling of a plurality of illumination modules which each per se provide a "basic illumination type". This can reduce the number of illumination modules to be kept in a coordinate measuring machine. In this case, the first interface device and the second interface device can be embodied such that they are of identical type, in order to provide a maximum compatibility of the individual illumination modules relative to one another. In particular, consideration should be given here to ensuring that light can be coupled across the interfaces from one illumination module into the other and, if necessary, an energy supply of each illumination module is ensured. Furthermore, in one configuration of the illumination module in accordance with the first aspect, it can be provided that the illumination module comprises a probe interface device. The latter can be provided for the workpiece-side coupling of a probe tip to the illumination module. This can make it possible to provide a measuring method which involves optically detecting the probing of a workpiece by means of a tactile probe tip.

In a further refinement of the illumination module in accordance with the first aspect, it can be provided that the illumination module comprises an identification device for identifying at least a type of the illumination module.

In this way, it becomes possible for a coordinate measuring machine or a regulating device of the coordinate measuring machine to know which illumination module(s) is (are) coupled to the optical sensor. In this way, it is possible to check whether the desired or correct illumination module has been coupled. In the case of a manual change as well, in this way it is possible directly to establish which illumination module was coupled. In this case, the identification device can communicate at least one type of the illumination module. Over and above that, however, it can also provide further data of the illumination module, such as, for example, status of the energy supply, functionality of one or more illumination arrangements, etc. The identification device can be provided as an active identification device, which requires a dedicated energy supply, or else as a passive identification device, which does not require a dedicated energy supply. By way of example, the identification device can be embodied as a permanent memory from which the required data of the illumination module can be read out. The identification device can be embodied in a wire-based fashion or alternatively in a wireless fashion. By way of example, the identification device can also be an RFID chip.

In a further refinement of the illumination module in accordance with the first aspect of the invention, it can be provided that the first interface device has a mechanical coupling device for the sensor-side coupling of the illumination module.

The mechanical coupling device can be provided for example by means of intermeshing projections and cutouts or by at least one clamping apparatus. Such a mechanical coupling device affords the advantage that it does not have to be supplied with energy during operation in order to couple the illumination module to an optical sensor.

In a further refinement of the illumination module in accordance with the first aspect, it can be provided that the first interface device has at least one permanent magnet for the sensor-side coupling of the illumination module.

By means of such a magnetic coupling device, too, secure coupling of the illumination module to the optical sensor can be provided. Furthermore, the permanent magnets at any rate do not have to be actively supplied with energy in order to provide the coupling. Furthermore, such a coupling provided by means of at least one permanent magnet can be separated again by a simple relative movement between the illumination module and the optical sensor, if the force correspondingly applied by actuators of a machine frame carrying the optical sensor is greater than the magnetic force of the at least one permanent magnet. Uniquely determined bearing points are provided in a magazine site of the illumination module in order to ensure its position reproducibly over the change process for the respective illumination module.

In a further refinement of the illumination module in accordance with the first aspect of the invention, it can be provided that the illumination module comprises a change interface device for coupling the illumination module to a magazine site of the coordinate measuring machine.

In this way, it becomes possible particularly simply to bring the illumination module into the magazine site and to retain it there. By way of example, the change interface device can be provided in a simple manner by means of a circumferential groove or a circumferential projection which extends wholly or partly around the outer circumference of the illumination module and intermeshes with cutouts or projections provided complementarily in a corresponding magazine site.

In one refinement of the coordinate measuring machine in accordance with the second aspect of the invention, it can be provided that the coordinate measuring machine comprises a regulating device designed to regulate a process of taking up and/or placing an illumination module in the at least one magazine site.

In this way, a possibility of automatically changing an illumination module is provided in a particularly simple manner. If a location of the holding device and of the at least one magazine site are known, corresponding movement sequences which regulate a process of taking up and/or placing an illumination module from and/or into a specific magazine site can be stored in the regulating device.

In a further refinement of the coordinate measuring machine in accordance with the second aspect of the invention, it can be provided that the optical sensor is movable by means of a quill in a first direction relative to a crossbar, wherein the quill is movable in a second direction along the crossbar, wherein the first direction and the second direction are perpendicular to one another, wherein the holding device is fixed parallel to the crossbar relative to the crossbar, and the at least one magazine site is movable relative to the optical sensor by means of a slide.

In this way it becomes possible, in the case of a coordinate measuring machine having a gantry construction known per se, for example, for the holding device to be fitted to the crossbar relatively near the optical sensor. By means of a further slide, the at least one magazine site can then be moved below the optical sensor in such a way that it becomes possible for an illumination module to be taken up or placed. In the case of such an arrangement, the travel distances for the optical sensor are very small, such that it becomes possible for an illumination module to be changed rapidly.

In a further refinement of the coordinate measuring machine in accordance with the second aspect of the invention, it can be provided that the holding device is aligned along a third direction, wherein the third direction is perpendicular to the first direction and perpendicular to the second direction, and wherein the optical sensor and the holding device are movable relative to one another parallel to the third direction.

In this way it becomes possible for the holding devices to be installed in a stationary fashion at other locations of the coordinate measuring machine and then for the optical sensor to move to them freely by means of the actuators of the machine frame of the coordinate measuring machine.

In a further refinement of the coordinate measuring machine in accordance with the second aspect of the invention, it can be provided that the illumination module comprises a first interface device at least for the sensor-side coupling of the illumination module in a defined position by means of a permanent magnet, wherein the coordinate measuring machine furthermore comprises a switchable electromagnet for at least partly neutralizing a magnetic field of the permanent magnet.

As has already been explained above, a particularly reliable coupling of the illumination module to the optical sensor can be provided by means of at least one permanent magnet in the illumination module, since said at least one permanent magnet does not require an energy supply and furthermore can easily be separated again by means of purely transverse movement. In order that the force to be exerted by the actuators of the coordinate measuring machine for separating the magnetic connection may be reduced, it can furthermore be provided that in the optical sensor, in particular, a switchable electromagnet is provided which optionally at least partly neutralizes the magnetic field of the permanent magnet.

In a further refinement of the coordinate measuring machine in accordance with the second aspect, it is provided that the at least one magazine site has a magazine site interface which provides at least one energy supply of an illumination module. This makes it possible for the illumination module to be operated even in the magazine site. This can be implemented, for example, in order to keep the illumination module at a constant temperature level with constant temperature distribution. Calibrations necessitated by fluctuations of a temperature level can thus be avoided. Moreover, provision can be made for using an illumination module for illuminating a measurement space of the coordinate measuring machine if it is placed in a magazine site.

This can be the case, in particular, if the magazine site is fitted directly to the movable machine frame of the coordinate measuring machine, in particular to or parallel to the crossbar of a gantry construction.

In one refinement of the method in accordance with the third aspect of the invention, it can be provided that the holding device has at least the first magazine site and a second magazine site, wherein at the beginning of the method the optical sensor is coupled to a second illumination module at least indirectly, and wherein firstly the following steps are performed:

moving the second illumination module coupled at least indirectly to the optical sensor into the second magazine site, performing a translational and/or rotational relative movement between the optical sensor and the second illumination module for the purpose of decoupling the optical sensor from the second illumination module.

In this way, an illumination module can also firstly be placed by means of a simple movement sequence. In particular, the relative movement between the optical sensor and the first illumination module can be a purely translational movement. If these steps are performed prior to the method in accordance with the third aspect of the invention, a simple change of an illumination module becomes possible in this way, wherein the change can be effected merely by means of simply regulatable transverse movements. Alternatively, it is also conceivable for a movement direction when placing an illumination module to be vertical. By way of example, an illumination module can also be placed from above in a type of fork. Precisely in the case of structurally relatively long illumination modules, what can thus be achieved is that the majority of the illumination module is arranged outside a measurement volume and the space that can be used on the coordinate measuring machine is thus optimized.

In a further refinement of the method in accordance with the third aspect of the invention, it can be provided that at the beginning of the method the optical sensor is coupled to a second illumination module at least indirectly, and wherein the method is performed in order to couple the first illumination module to the second illumination module. In this way, it becomes possible to couple a plurality of illumination modules in a cascade-like fashion and to provide a specific illumination of the workpiece by combination of their illumination modules.

This also makes it possible, in particular, to minimize the number of individual illumination modules to be kept in the coordinate measuring machine. In a further refinement, it can be provided that a separating auxiliary element is provided. Such a separating auxiliary element can ensure that, in the case of a cascade-like coupling to a first and a second illumination module, a separation at a magazine site is carried out at the correct place, e.g. between the first and second illumination modules. The separating auxiliary element can be for example an electromagnet which neutralizes a magnetic holding force at a desired place. A mechanical separating auxiliary element can also be provided, for example, which can be arranged in particular at the magazine site. By way of example, a sheet-metal element can be arranged in such a way that it is guided into a change interface during introduction into the magazine site and shields a magnetic holding force. The at least partial reduction of the holding force can thus also be effected passively if, in the magazine site, a suitable thin part or metal sheet is inserted between magnet and the opposite side thereof e.g. during the introduction movement. The thin part can be produced from µ-metal, for example, which results in strong shielding of the magnetic field lines and thus of the holding force.

It goes without saying that the features mentioned above and those yet to be explained below can be used not only in the combination respectively indicated, but also in other combinations or by themselves, without departing from the scope of the present invention.

BRIEF DESCRIPTION OF THE DRAWINGS

Embodiments of the invention are illustrated in the drawings and are explained in greater detail in the description below. In the Figures.

DETAILED DESCRIPTION OF THE INVENTION

Figure 1:
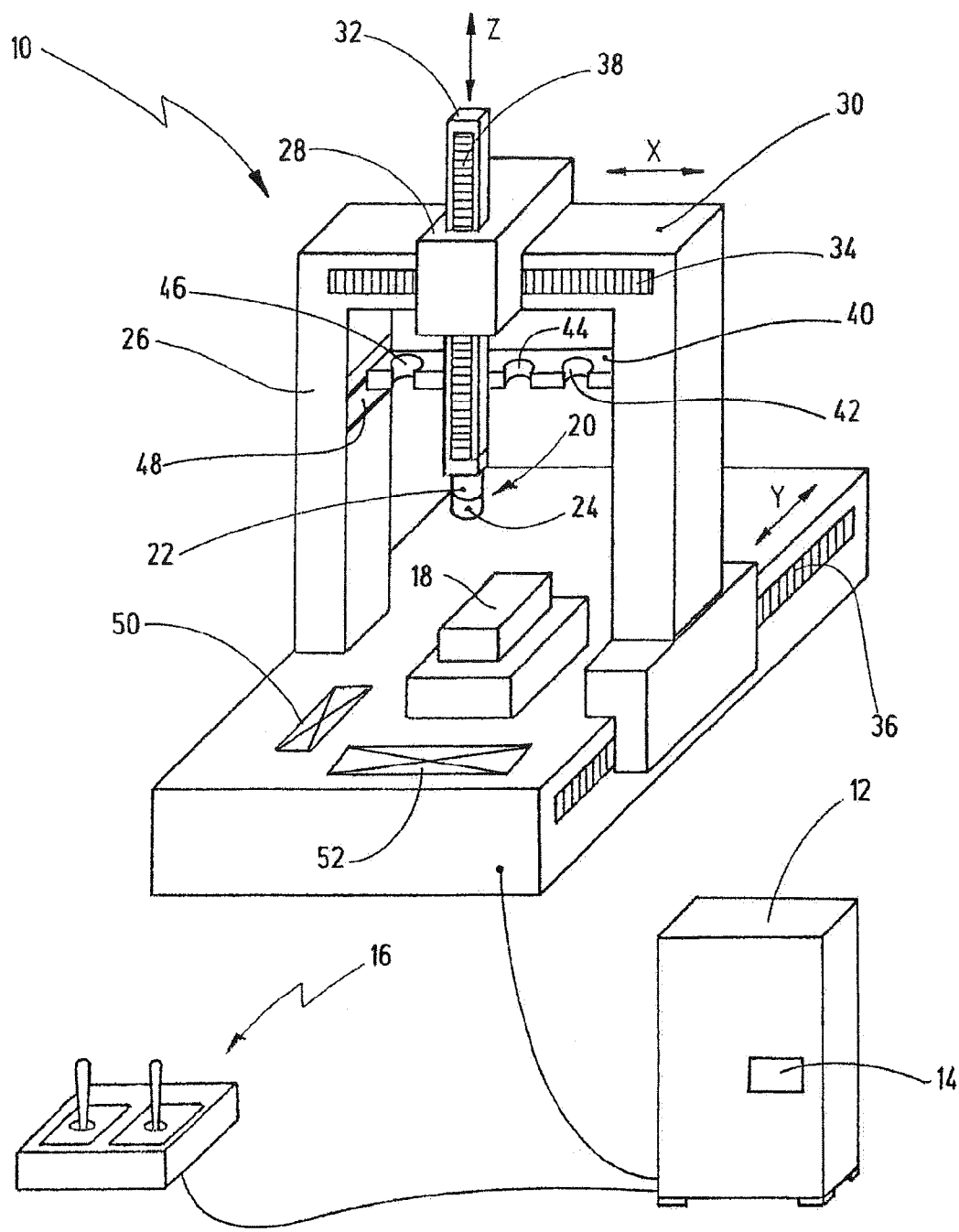
FIG. 1 shows one embodiment of a coordinate measuring machine according to the invention.

FIG. 1 shows one embodiment of a coordinate measuring machine 10. The coordinate measuring machine 10 comprises a regulating device 12 designed to control the coordinate measuring machine 10 in an automated manner. For this purpose, the regulating device 12 can have a data processing unit 14. Furthermore, the regulating device 12 can also have display devices that display information about selected operating modes, measurement results, etc. to a user of the coordinate measuring machine 10. Furthermore, the coordinate measuring machine 10 comprises an operation device 16, which enables a user to control the coordinate measuring machine 10. The operation device 16 is merely illustrated schematically here. This is intended firstly to enable the coordinate measuring machine 10 to be moved manually. Furthermore, the operation device 16 can be designed to enable the user to input the system inputs into the regulating device 12 in order to select an operating mode, etc. The regulating device 12 can furthermore also automatically regulate the coordinate measuring machine 10.

The coordinate measuring machine 10 serves to measure a workpiece 18. For this purpose, the coordinate measuring machine 10 comprises an optical sensor head 20 having an optical sensor 22 and an illumination module 24. The illumination module 24 is coupled to the optical sensor 22.

In order to be able to move the optical sensor head 20 relative to the workpiece 18, the coordinate measuring machine in the embodiment illustrated comprises a gantry 26, which is movable in a Y-direction. A slide 28 is mounted movably in an X-direction on a crossbar 30 of the gantry 26. In this way, the optical sensor head 20 can be moved in the X-direction by the movement of the slide 28 on the crossbar 30. A quill 32 is provided in the slide 28, said quill being movable relative to the slide 28 in a Z-direction. The optical sensor head 20 is then fitted to the quill 32. In this way, it is possible to move the optical sensor head 20 in all three spatial directions X, Y and Z. A mounting of the gantry 26 of the slide 28 and of the quill 32 with respect to one another can be implemented by means of so-called air bearings, for example. In order to detect a position of the gantry 26, of the slide 28 and of the quill 32, the coordinate measuring machine 10 can have scales. By way of example, a scale 34 for the X-direction, a scale 36 for the Y-direction and a scale 38 for the Z-direction can be provided.

Furthermore, the coordinate measuring machine 10 can comprise a holding device 40. In the holding device 40, at least one magazine site is provided, in particular a plurality of magazine sites are provided. A first magazine site 42, a second magazine site 44 and a third magazine site 46 are illustrated. Each of the magazine sites 42, 44, 46 can be provided for carrying a specific illumination module 24. An illumination module 24 can then be changed in an automated manner for example in such a way that the regulating device 12 places a currently coupled illumination module 24 in one of the magazine sites 42, 44, 46 and takes up a further illumination module (not illustrated) from another of the magazine sites 42, 44, 46.

In the embodiment illustrated, the holding device 40 is fitted to the gantry 26, such that the holding device 40 extends below the crossbar 30 parallel to the crossbar 30 in the X-direction. Alternatively, provision can also be made, for example, for fitting the holding device 40 directly to the crossbar 30. By means of a corresponding arrangement of the holding device 40, travels for changing an illumination module 24 can be kept particularly short. As is evident from the illustrated view, however, in the illustrated arrangement there is initially no possibility at all for moving the optical sensor 22 and the holding device 40 relative to one another in the Y-direction. Therefore, the holding device 40 is mounted on a slide 48 in the gantry 26 in the embodiment illustrated, such that relative movement of the holding device 40 with respect to the optical sensor 22 in the Y-direction becomes possible. In this case, the holding device 40 is moved in the Y-direction relative to the gantry 26 of the slide 48.

It goes without saying that alternative arrangements of the holding device 40 are furthermore conceivable. By way of example, it is possible for the holding device 40 to be positioned at schematically indicated installation locations 50, 52. It is then situated freely in the coordinate measuring machine 10. The optical sensor 22 can then move freely to the magazine sites 42, 44, 46 in order to place or take up an illumination module 24.

Figure 2:
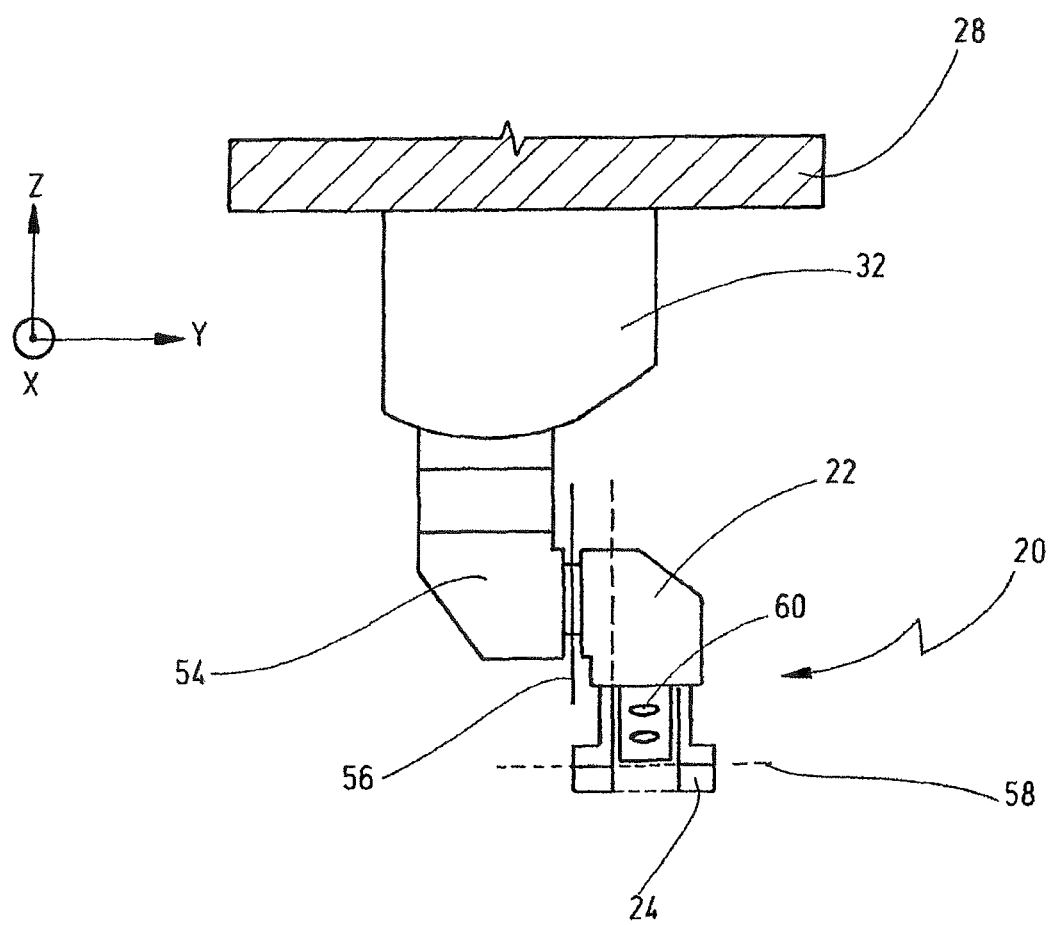
FIG. 2 shows a detail view of an optical sensor of a coordinate measuring machine, said optical sensor being equipped with an illumination module according to the invention.

FIG. 2 shows a schematic detail view of part of the coordinate measuring machine 10. The slide 28 and the quill 32 are once again illustrated schematically. As can be gathered from FIG. 2, by way of example, a so-called rotary pivoting unit 54 can be arranged on the quill 32, said unit enabling the optical sensor 22 to rotate both about the Z-direction and about the Y-direction. In this way, the optical sensor 22 can be aligned in a multiplicity of directions in order to view the workpiece 18 from a desired viewing angle. In this case, various system components are coupled via change surfaces 56; by way of example, the optical sensor 22 is coupled to the rotary pivoting unit 54 by means of a change surface 56. Electrical supply lines, communication interfaces, optical interfaces, etc. are provided via the change surface 56 in order firstly to supply the optical sensor 22 with energy and secondly to be able to irradiate the workpiece 18. Furthermore, the data detected by the optical sensor 22 are conducted via the change surface 56 and the interfaces provided there to the regulating device 12 and the data processing unit 14 thereof.

The illumination module 24 is coupled to the optical sensor 22 along a first interface device 58. In the embodiment illustrated, the illumination module 24 has the form of a circular ring. Furthermore, the optical sensor 22 also has an imaging optics 60, which serves to image light radiation received from a workpiece 18 onto the optical sensor 22.

The configuration of the illumination module 24 is explained below with regard to the further figures.

Figure 3:
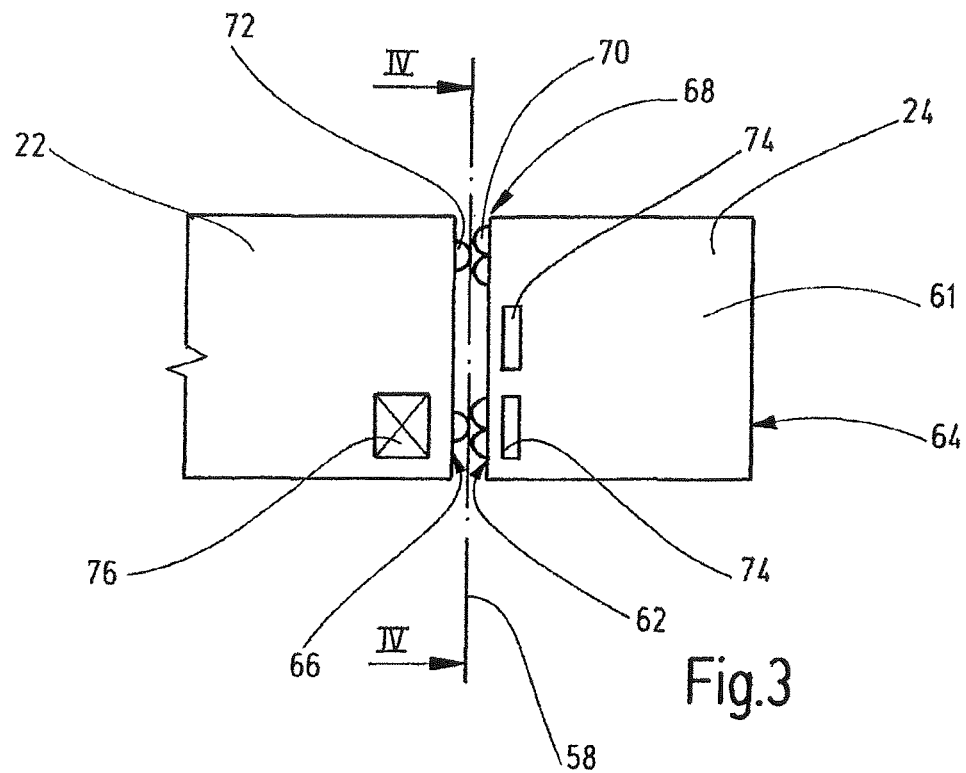
FIG. 3 shows a schematic view of an illumination module coupled to an optical sensor.

FIG. 3 schematically illustrates the illumination module 24 coupled to the optical sensor 22.

The illumination module 24 comprises a main body 61. The main body 61 in turn has a sensor side 62 facing the optical sensor 22. Situated opposite the sensor side 62, the main body 61 has a workpiece side 64, which faces the workpiece 18 during operation.

In the coupled state, the sensor side 62 of the main body 61 is situated opposite a coupling side 66 of the sensor 22.

A three-point mounting 68 is provided for coupling the coupling side 66 of the optical sensor 22 and the sensor side 62 of the main body 61. Such a three-point mounting is known in principle to a person of average skill in the art and serves to couple the illumination module 24 to the optical sensor 62 in an unambiguous position. For this purpose, provision is made of three-point bearing elements 68 on the sensor side 62 of the illumination module 24 and three-point bearing elements 72 on the coupling side 66 of the optical sensor 22. By way of example, provision can be made for a three-point mounting to be effected. In this case, provision is made, for example, of a mounting by means of ball pairs, ball-roller pairs or a mounting in a depression for the first ball, a mounting in a V-groove for the second ball and a mounting on a surface for the third ball.

In order to apply a required holding force that holds the illumination module 24 and the optical sensor 22 together, provision can be made for a permanent magnet 74 to be provided in the main body 61. In this case, the permanent magnet 74 is arranged in such a way that the magnetic field lines extend via the first interface device 58 through the optical sensor 22, such that a suitable holding force is provided between the illumination module 24 and the optical sensor 22. Of course, the magnetic field lines in this case have to extend through a ferromagnetic material in the optical sensor 22. A further permanent magnet or an electromagnet (not illustrated) can also be present in the optical sensor in order, together with the permanent magnet 74, to apply the required holding force. It goes without saying that provision can furthermore also be made for providing additional permanent magnets both in the illumination module 24 and/or in the optical sensor 22. It goes without saying that provision can also be made for the permanent magnet 74 to be provided only in the optical sensor 22.

Furthermore, provision can be made for the optical sensor 22 to have an electromagnet 76 that is switchable. In this case, said electromagnet is configured in such a way that it at least partly neutralizes a magnetic field applied by the permanent magnet 74, such that the illumination module 24 can be separated from the optical sensor 22 more easily. It goes without saying that provision can also be made for one or a plurality of electromagnets to be arranged in the illumination module 24. In order to avoid the need for an energy supply of the illumination module 24, the electromagnet will generally be provided in the optical sensor 22.

Furthermore, however, an energy receiving device 77 can also be provided as illumination module 24, said energy receiving device being coupled to the optical sensor 22 either in a wireless fashion or in a wire-based fashion via the first interface device 58 in such a way that the illumination module 24 is provided with an energy supply.

Figure 4:
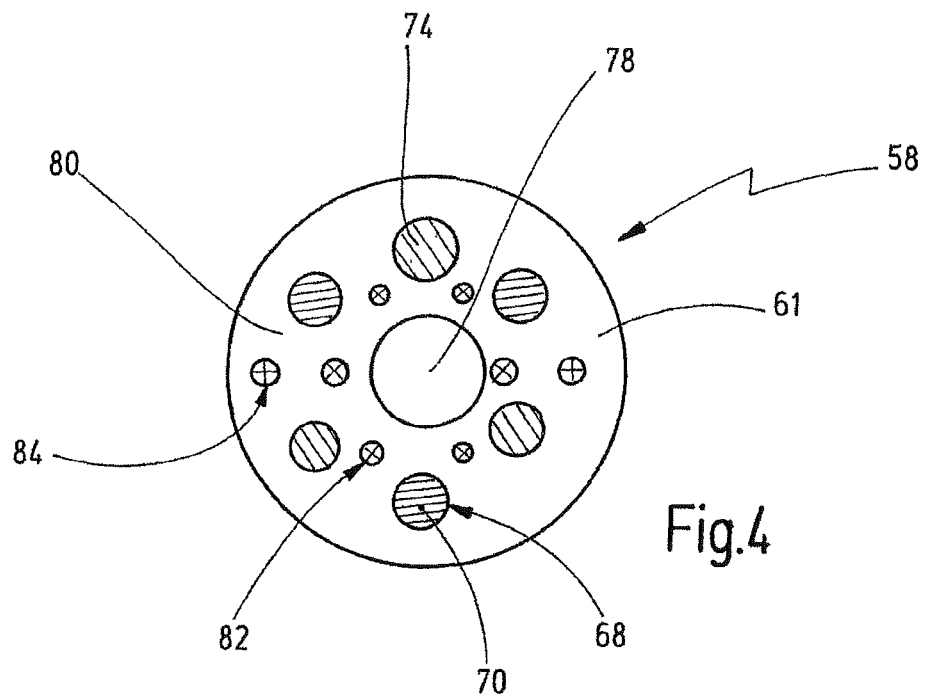
FIG. 4 shows a schematic cross-sectional view along a line IV-IV in FIG. 3, FIGS. 5a to 5c show different embodiments of an illumination module according to the invention.

FIG. 4 shows a cross-sectional view along a line IV-IV in FIG. 3.

As can be discerned in the cross section of FIG. 4, the main body 61 has the form of a circular ring. In other words, the main body 61 substantially has the form of a cylinder having a central cutout. In this respect, the main body 61 of the illumination module 24 has a free central region 78 forming the cutout. Furthermore, the main body 61 has an edge region 80. The edge region 80 then has the first interface device 58 having in the embodiment illustrated, for example, three permanent magnets 74, and further optical interfaces 82, in order to guide light from the optical sensor 22 into the illumination module 24, and electrical interfaces 84 for the energy supply of the illumination module 24.

It goes without saying that the embodiment illustrated in FIG. 4 should be understood merely by way of example. For example, an illumination module 24 comprising only passive illumination arrangements can also comprise no electrical interfaces 84 whatsoever in the edge region 80. Furthermore, it is possible for an illumination module 24 comprising only active illumination arrangements to comprise no optical interfaces 82 whatsoever in the edge region 80.

Figure 5A:
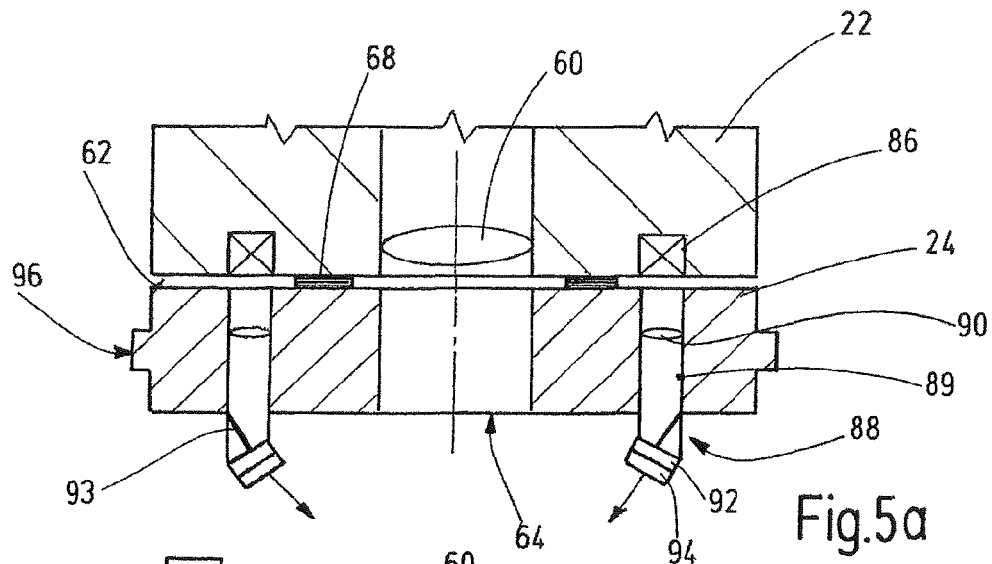

FIG. 5a illustrates a first embodiment of an illumination module 24 by way of example. Identical elements are identified by identical reference signs and will not be explained again hereinafter.

In the embodiment illustrated, the optical sensor 22 has at least one light source 86. In the embodiment illustrated, the light source 86 is embodied for example in a ring-shaped fashion, i.e. it has a ring-shaped, light-emitting element. However, the light source 86 can for example also be embodied as a plurality of point light sources, for example LEDs or OLEDs or lasers, arranged in a ring-shaped fashion.

The illumination module 24 comprises an illumination arrangement 88. The illumination arrangement 88 is embodied only in a passive fashion. The illumination arrangement 88 therefore has a ring-shaped light guide 89 and can furthermore have refractive optical elements 90, diffractive optical elements 92, reflective optical elements 93 and/or holographic optical elements 94. This need not be the case, however. Arbitrary combinations of such optical elements are conceivable in order to provide a desired illumination by means of the illumination arrangement 88. The light emitted by the light source 86 is coupled into the light guide 89, guided through the illumination module 24 and deflected in a desired manner, such that a suitable illumination of the workpiece 18 by means of the illumination module 24 is ultimately provided. Furthermore, the illumination module 24 comprises a change interface device 96, which is embodied as a circumferential projection in the embodiment illustrated. The circumferential projection can then interact for example with a circumferential groove in a magazine site 42, 44, 46 of the holding device 40, such that, for example, the illumination module 24 can then be inserted into such a magazine site.

Figure 5B:
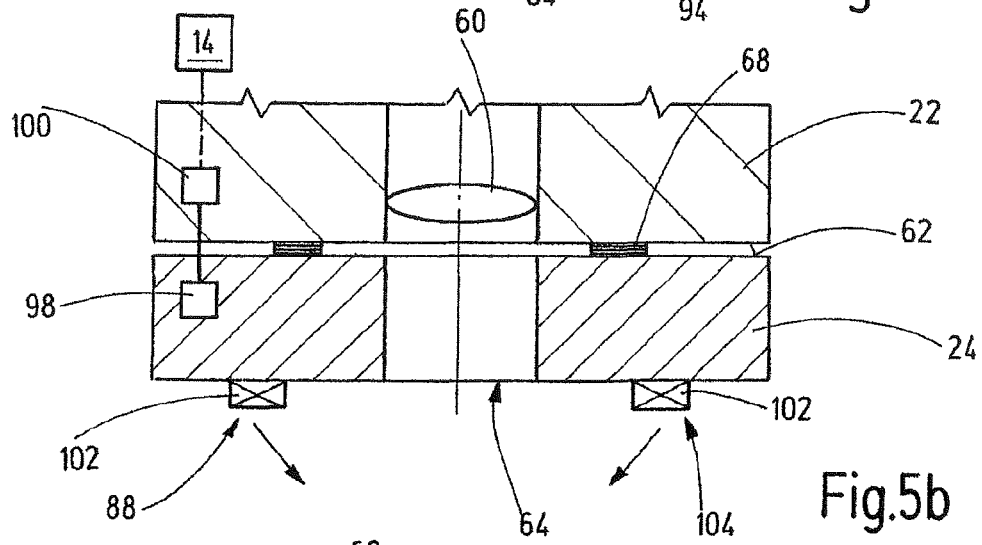

FIG. 5b illustrates a further embodiment of an illumination module 24. Identical elements are once again identified by identical reference signs. Therefore, only the differences will be discussed.

The illumination module 24 comprises an identification device 98, which can be read by an identification reader 100. In this case, the reading can be affected in a wire-based manner or else in a wireless manner. The identification reader 100 can be arranged in the optical sensor 22. However, it can also be arranged in any other element of the coordinate measuring machine 10. It can also directly be part of the regulating device 12 or of the data processing unit 14. In this way, it is possible unambiguously to identify the illumination module 24 and to provide this information to the regulating device 12. This firstly serves to identify the coupled illumination module 24 and the illumination type or types thereof; secondly, by way of example, dimensions of the illumination module 24 can also be stored in the identification device 98 and read out in order in this way to enable a collision-free regulation of a movement of the optical sensor 22 coupled to the illumination module 24.

In the embodiment illustrated, the illumination module 24 is configured as a so-called active illumination module. It comprises two light sources 102. Each light source 102 forms an illumination arrangement, such that the illumination module 24 in FIG. 5b comprises two illumination arrangements 88, 104.

In particular, the light source 102 can be embodied using energy-saving LED/OLED technology. A laser, too, is possible as light source 102. The light sources 102 can be used for example in groups, separated according to colors, in continuous wave operation or in pulsed operation. If many different light sources are intended to be used, then it is advantageous to provide a control device directly in the illumination module 24. Correspondingly, an electrical interface for supplying such a control device with energy and control signals is to be provided via the first interface device 58. In this case, the supply with electrical energy can be embodied in a wireless fashion or in a wire-based fashion. In particular, it can furthermore be provided that an energy supply for a control device and an energy supply for the light sources 102 are embodied separately from one another.

Figure 5C:
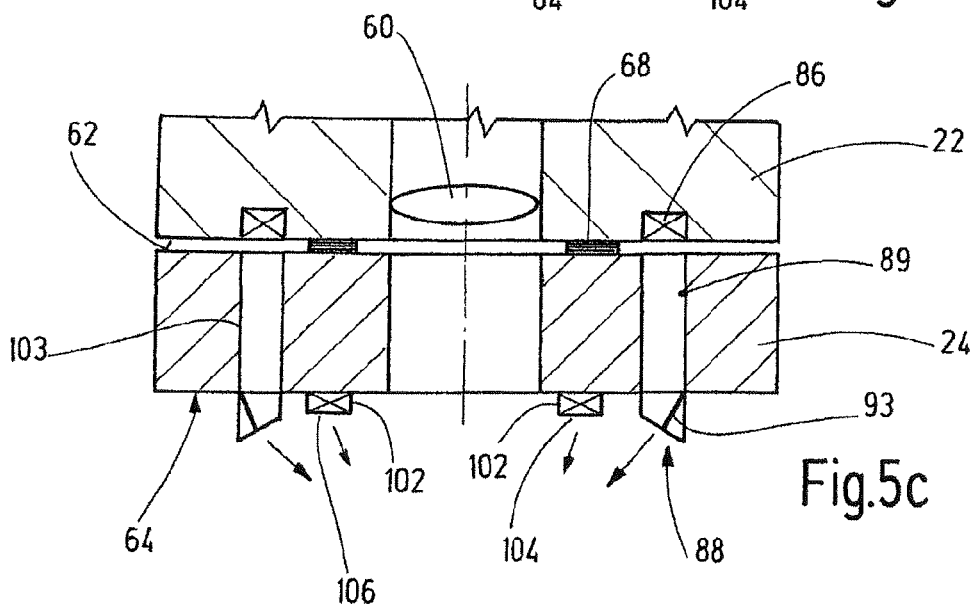

FIG. 5c illustrates yet another embodiment of an illumination module 24. The illumination module 24 in FIG. 5c comprises in combination both active and passive illumination arrangements 88, 104 and 106. In the example illustrated, for instance, the illumination arrangement 88 is a circular ring light which, merely by means of two light guides 89, 103 and reflective optical elements 93, guides light emitted by a light source 86 of the optical sensor 22 through the illumination module 24 and reflects it onto the workpiece 18 as desired. Furthermore, two illumination arrangements 104 and 106, each provided as light sources 102 that emit light actively, are provided in a supporting manner.

Consequently, the illumination module 24 according to the invention can comprise either passive illumination arrangements 88, 104, 106, active illumination arrangements 88, 104, 106 or both active and passive illumination arrangements 88, 104, 106.

Figure 6:
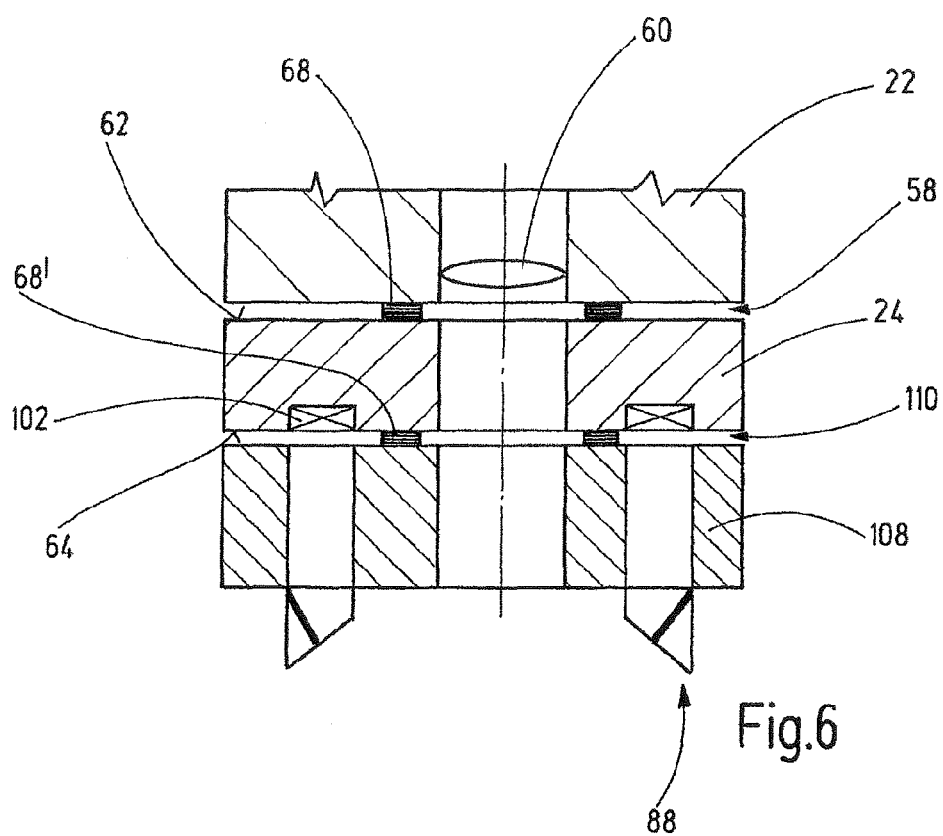
FIG. 6 shows one embodiment of a cascade coupling of a plurality of illumination modules according to the invention.

FIG. 6 illustrates yet another embodiment of an illumination module 24. The illumination module 24 illustrated therein comprises on the sensor side 62 a first interface arrangement 58, which couples the illumination module 24 to the optical sensor 22. Furthermore, the illumination module 24 comprises on its workpiece side 64 a second interface arrangement 110, which serves for coupling a second illumination module 108 to the illumination module 24. In this case, the second interface device 110 can be embodied like the first interface device 58 in order to enable the fullest possible compatibility of the illumination modules 24, 108 with regard to their coupling to one another and to the optical sensor 22. This need not necessarily be the case, however. Provision can also be made for the second interface device 110 to have a different configuration than the interface device 58. Furthermore, provision can be made for an identification device 98 to be arranged both in the illumination module 24 and in the second illumination module 108, such that the identification reader 100 then knows the entire arrangement. The latter can then be taken into account in the case of collision considerations and for optimum functionality.

By means of this cascade-like coupling of a plurality of illumination modules 24, 108, in particular the number of illumination modules 24, 108 provided in total in a coordinate measuring machine 10 can be minimized. In particular, it can be provided, for example, that a coupling of two illumination modules 24, 108 provides a type of illumination for which a separate illumination module would otherwise have to have been provided. A particularly high flexibility in the use of the illumination modules 24, 108 is thus provided.

Figure 7:
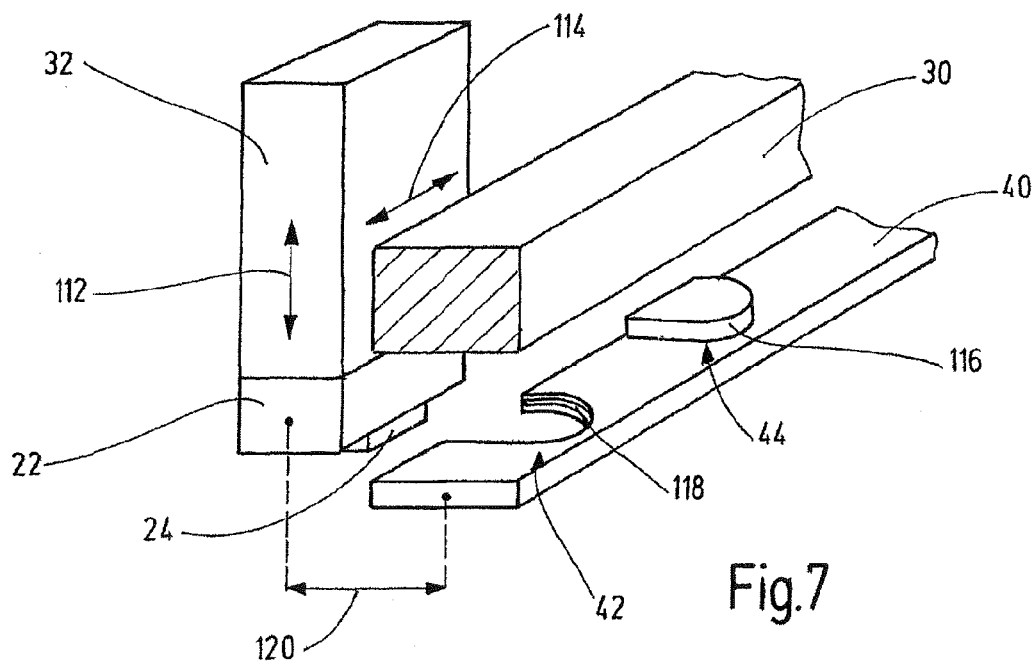
FIG. 7 shows a schematic detail view in the region of a holding device in a coordinate measuring machine according to the invention.

FIG. 7 schematically illustrates an excerpt from the coordinate measuring machine 10 which exhibits travel movements for changing the illumination modules 24. In this case, the elements are merely indicated schematically and identified by the same reference signs as in the other figures.

In the embodiment illustrated, the quill 32 is attached to the crossbar 30 in an articulated manner and is movable relative thereto in the Z-direction 112 and in the X-direction 114.

The illustration furthermore shows schematically that at a first magazine site 42 the holding device 40 has a circumferential groove 118, into which, for example, a change interface device 96, as illustrated in FIG. 5a, can engage. A further illumination module 116 is arranged in the second magazine site 44. By means of movement of the quill 32 relative to the crossbar 30 in the direction 112, 114, an illumination module 24 already coupled to the optical sensor 22 can be brought to a position in which only a transverse movement 120 of the quill 32 and the holding device 40 relative to one another still has to be effected in order to introduce the illumination module 24 into the magazine site 42, for example. The relative movement can either be performed by the holding device 40 being moved relative to the quill 32 by means of the slide 48, for example. However, if the holding device 40 is provided at an installation location 50, 52, for example, this can also be affected by means of a corresponding movement of the optical sensor 22 while the holding device 40 is stationary.

The illumination module 24 is then situated in the magazine site 42, the change interface device 96 intermeshing with the groove 118. By moving the quill 32 in the Z-direction 112, it is then possible to apply a suitable high force, such that the holding force from the permanent magnets 74 is overcome and the illumination module 24 thus "tears away" from the optical sensor 22. In this case, it can furthermore also be provided that a switchable electromagnet 76 provided by way of example is switched, which at least partly neutralizes a holding force of the permanent magnet 74.

Figure 8:
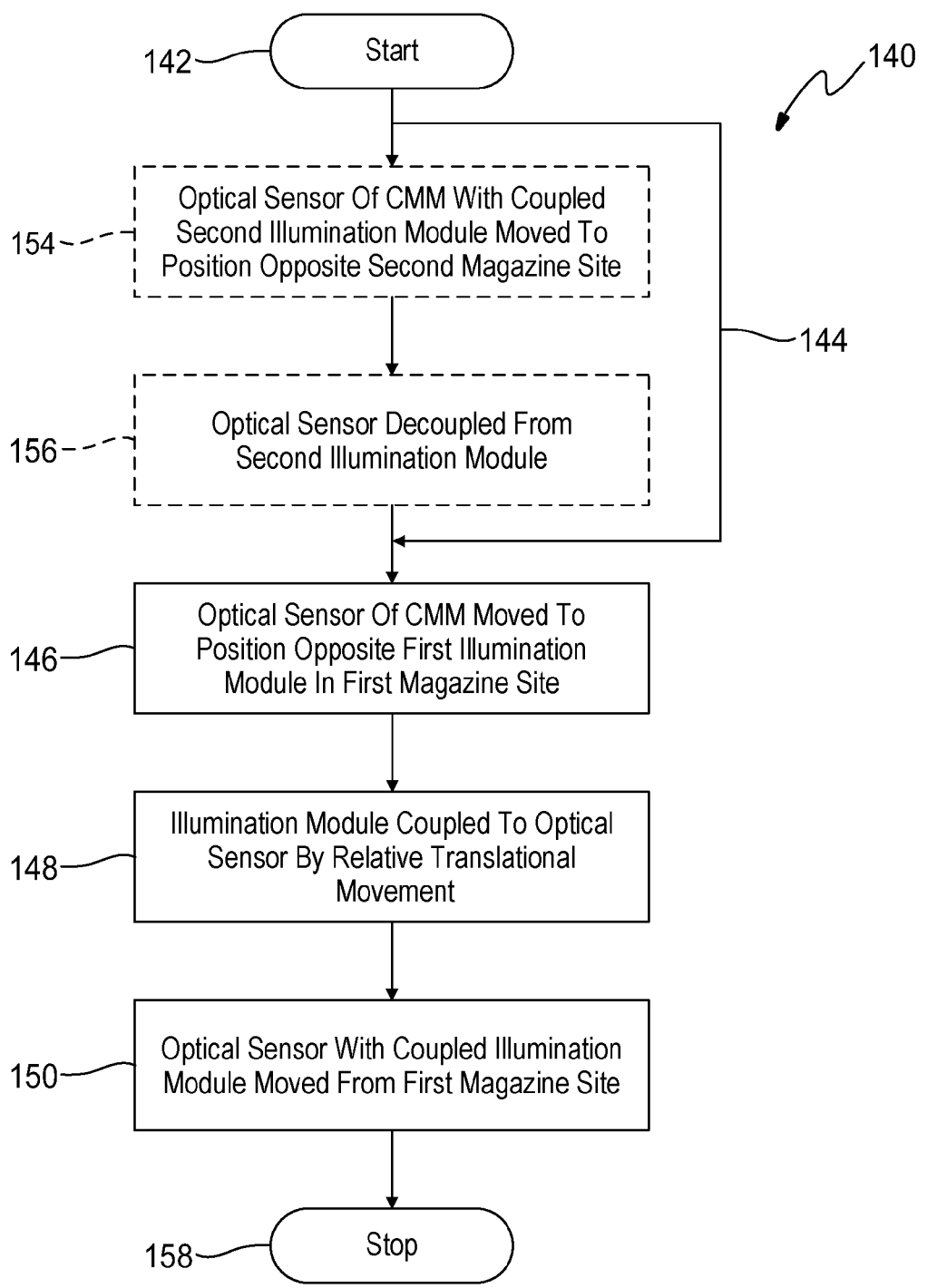
FIG. 8 shows a schematic flow chart of a method according to the invention.

FIG. 8 schematically illustrates a flow chart of a method 140 for taking up an illumination module 24.

The method begins in a start step 142 and then continues firstly along a branch 144 in a step 146. A movement of the optical sensor 22 of the coordinate measuring machine 10 and of the first magazine site 42, which has an illumination module, relative to one another into a first position takes place in step 146. In this first position, as was explained above, the optical sensor 22 and the first illumination module 24 can be coupled at least indirectly, in particular directly, by means of at least one translational movement relative to one another.

In other words, the optical sensor 22 and the illumination module 24 are arranged relative to one another in the first position in such a way that the sensor side 62 of the illumination module 24 and the coupling side 66 of the optical sensor 22 lie opposite and parallel to one another.

In a step 148, a purely translational relative movement between the optical sensor 22 and the first illumination module 24 is then performed and the optical sensor 22 is thus coupled to the illumination module 24 at least indirectly. In this case, "at least indirectly" should be understood to mean that either the illumination module 24 is directly coupled to the optical sensor 22 or else one or a plurality of further illumination modules 108 can also be situated between the optical sensor 22 and the illumination module 24.

In a step 150, the optical sensor with the at least indirectly coupled illumination module 24 is then moved out of the first magazine site 42. In the embodiment illustrated in FIG. 7, this will be a transverse movement 120. If a connection in the manner of the change interface device 96 and the groove 118 is provided for holding the illumination module 24 in the magazine site 42, 44, 46, then said movement will be performed parallel to the groove 118.

The method then ends in a stop step 158. The illumination module 24 is now removed from the corresponding magazine site 42, 44, 46.

In an embodiment of the method 140 which ultimately provides for changing the illumination module 24, two steps 154, 156 are performed before step 146.

In this case, firstly an illumination module that has already been coupled to the optical sensor 22 is placed in one of the magazine sites 42, 44, 46.

This is carried out by means of the fact that firstly, in step 154, the second illumination module coupled to the optical sensor 22 is introduced into a respective magazine site 42, 44, 46, as was described for example in connection with FIG. 7.

If the illumination module 24 is then coupled to the corresponding magazine site 42, 44, 46, the quill 32 is moved in the Z-direction 112. In this case, if appropriate, the electromagnet 76 can be switched in a supporting manner. In this way, the holding force generated by the permanent magnet 74 is then overcome and the optical sensor 22 is separated from the illumination module 24. The method can now continue with steps 146 to 158 in order to couple a further illumination module 24 to the optical sensor 22.

What is claimed is:

1. An illumination module for a coordinate measuring machine for measuring a workpiece by means of an optical sensor, wherein the illumination module comprises a main body having a sensor side and a workpiece side, wherein the sensor side has a first interface device at least for the sensor-side coupling of the illumination module in a defined position, and wherein the illumination module comprises at least one illumination arrangement for illuminating the workpiece, wherein the main body has the form of a ring having a free central region and an edge region, wherein the at least one illumination arrangement and the first interface device are arranged in the edge region, and further wherein the illumination module comprises a second interface device for coupling the illumination module to a magazine site of the coordinate measuring machine.

2. The illumination module as claimed in claim 1, wherein the at least one illumination arrangement has at least one of a group consisting of a light guide, a refractive optical element, a diffractive optical element, a holographic optical element and a reflective optical element.

3. The illumination module as claimed in claim 1, wherein the at least one illumination arrangement has a ring-shaped light guide.

4. The illumination module as claimed in claim 1, wherein the illumination module comprises a plurality of illumination arrangements each having at least one light guide.

5. The illumination module as claimed in claim 1, wherein the at least one illumination arrangement has a light source.

6. The illumination module as claimed in claim 5, wherein the light source is an LED or an OLED or a laser.

7. The illumination module as claimed in claim 1, wherein the first interface device of the illumination module has an energy receiving device for receiving energy.

8. The illumination module as claimed in claim 1, wherein the main body has the form of a circular ring.

9. The illumination module as claimed in claim 1, wherein the illumination module comprises a third interface device for the workpiece-side coupling of the illumination module to a further illumination module or a tactile sensor.

10. The illumination module as claimed in claim 1, wherein the illumination module comprises an identification device for identifying at least a type of the illumination module.

11. The illumination module as claimed in claim 1, wherein the first interface device has a mechanical coupling device for the sensor-side coupling of the illumination module.

12. The illumination module as claimed in claim 1, wherein the first interface device has at least one permanent magnet for the sensor-side coupling of the illumination module.

13. A coordinate measuring machine for measuring a workpiece by means of an optical sensor, wherein the coordinate measuring machine comprises at least one illumination module for a coordinate measuring machine for measuring a workpiece by means of an optical sensor, wherein the illumination module comprises a main body having a sensor side and a workpiece side, wherein the sensor side has a first interface device at least for the sensor-side coupling of the illumination module in a defined position, and wherein the illumination module comprises at least one illumination arrangement for illuminating the workpiece, wherein the main body has the form of a ring having a free central region and an edge region, wherein the at least one illumination arrangement and the first interface device are arranged in the edge region, and wherein the coordinate measuring machine further comprises a holding device having at least one magazine site for the illumination module, and further wherein the illumination module comprises a second change interface device for coupling the illumination module to a magazine site of the coordinate measuring machine.

14. The coordinate measuring machine as claimed in claim 13, wherein the coordinate measuring machine furthermore comprises a regulating device designed to regulate at least one of a process of taking up and a process of placing an illumination module in the at least one magazine site.

15. The coordinate measuring machine as claimed in claim 13, wherein the optical sensor is movable by means of a quill in a first direction relative to a crossbar, wherein the quill is movable in a second direction along the crossbar, wherein the first direction and the second direction are perpendicular to one another, wherein the holding device is fixed parallel to the crossbar relative to the crossbar, and the at least one magazine site is movable relative to the optical sensor by means of a slide.

16. The coordinate measuring machine as claimed in claim 13, wherein the holding device is aligned along a third direction, wherein the third direction is perpendicular to a first direction and perpendicular to a second direction, and wherein the optical sensor and the holding device are movable relative to one another parallel to the third direction.

17. The coordinate measuring machine as claimed in claim 13, wherein the illumination module comprises a first interface device at least for the sensor-side coupling of the illumination module in the defined position by means of a permanent magnet, wherein the coordinate measuring machine furthermore comprises a switchable electromagnet for at least partly neutralizing a magnetic field of the permanent magnet.

18. A method for taking up an illumination module of a coordinate measuring machine for measuring a workpiece by means of an optical sensor, wherein the coordinate measuring machine comprises a first illumination module having a coupling interface, and a holding device having at least one first magazine site for the first illumination module, comprising the following steps:

moving an optical sensor of the coordinate measuring machine into a first position relative to a first magazine site having the first illumination module, performing at least one of a translational and a rotational relative movement between the optical sensor and the first illumination module for the purpose of at least indirectly coupling the optical sensor to the first illumination module via said coupling interface, and moving the optical sensor with the first illumination module coupled at least indirectly thereto so that the first illumination module is moved out of the first magazine site.

19. The method as claimed in claim 18, wherein the holding device has at least the first magazine site and a second magazine site, wherein at the beginning of the method the optical sensor is coupled to a second illumination module at least indirectly, and wherein firstly the following steps are performed:

moving the optical sensor to a second position so that the second illumination module is positioned relative to the second magazine site, and performing at least one of a translational and a rotational relative movement between the optical sensor and the second illumination module for the purpose of decoupling the optical sensor from the second illumination module.

20. The method as claimed in claim 18, wherein at the beginning of the method the optical sensor is coupled to a second illumination module at least indirectly, and wherein the first moving step of the method is performed so that the second illumination module is positioned relative to said first magazine site and the performing step of the method is performed in order to couple the first illumination module to the second illumination module.

21. A non-transitory computer readable storage medium containing a computer program product comprising program code designed to perform a method for taking up an illumination module of a coordinate measuring machine for measuring a workpiece by means of an optical sensor, wherein the coordinate measuring machine comprises at least one first illumination module having a coupling interface, and a holding device having at least one first magazine site for the first illumination module, comprising the steps of:

moving the optical sensor of the coordinate measuring machine into a first position relative to said first magazine site, performing at least one of a translational and a rotational relative movement between the optical sensor and the first illumination module for the purpose of at least indirectly coupling via said coupling interface the optical sensor to the first illumination module, and moving the optical sensor with the first illumination module coupled at least indirectly thereto so that the first illumination module is moved out of the first magazine site.

* * * * *

UNITED STATES PATENT AND TRADEMARK OFFICE
CERTIFICATE OF CORRECTION

PATENT NO. : 9,664,887 B2  
APPLICATION NO. : 14/529964  
DATED : May 30, 2017  
INVENTOR(S) : Thomas Engel Page 1 of 1

It is certified that error appears in the above-identified patent and that said Letters Patent is hereby corrected as shown below:

In the Claims

Column 18  
Line 58   after "second", delete "change"

Signed and Sealed this  
Ninth Day of January, 2018

Joseph Matal  
*Performing the Functions and Duties of the*  
*Under Secretary of Commerce for Intellectual Property and*  
*Director of the United States Patent and Trademark Office*